Dec. 19, 1967    D. A. LIVERANO    3,358,574
CAMERA LOCK MECHANISM
Filed May 25, 1965    2 Sheets-Sheet 1
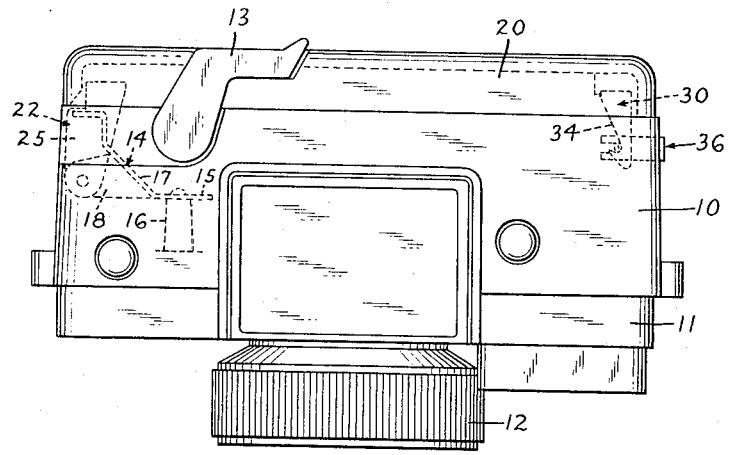
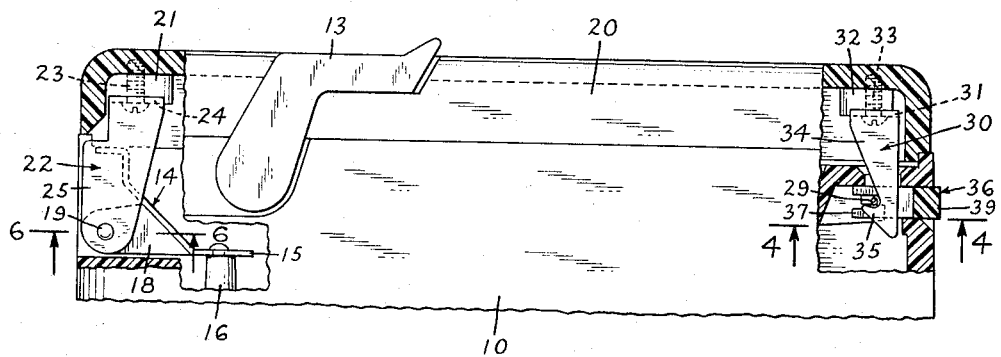
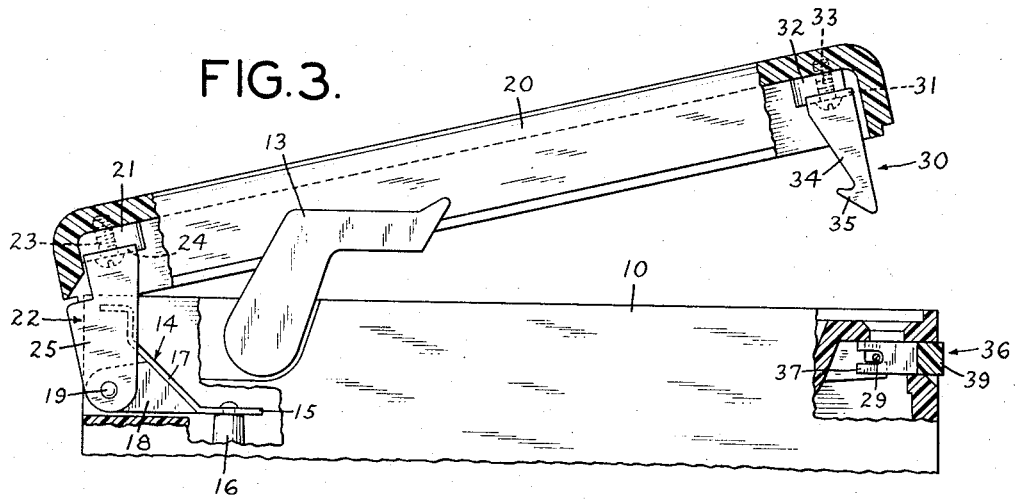

Dec. 19, 1967  D. A. LIVERANO  3,358,574
CAMERA LOCK MECHANISM
Filed May 25, 1965  2 Sheets-Sheet 2

United States Patent Office 3,358,574
Patented Dec. 19, 1967

3,358,574
CAMERA LOCK MECHANISM
Dino A. Liverano, Brooklyn, N.Y., assignor to Whitehouse Products, Inc., Brooklyn, N.Y., a corporation of New York
Filed May 25, 1965, Ser. No. 458,706
5 Claims. (Cl. 95—11)

ABSTRACT OF THE DISCLOSURE

A camera lock mechanism in which a reed-like spring mounted within the camera central housing is engaged by a hooked lock fixed to the back cover. Means extending to the exterior of the central housing is arranged, when pressed inwardly, to bow the reed spring and free the hooked lock.

---

Figure 4:
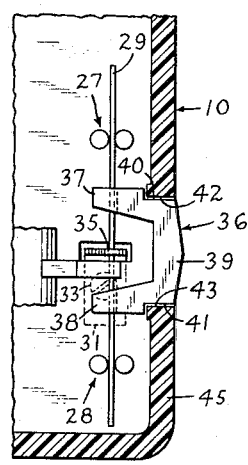

The present invention relates to cameras intended for use with film cartridges or cassettes, and particularly to an improved releasable lock mechanism for a hinged cover of such cameras.

Film cartridges are available on the market today and avoid the loading problems commonly encountered with roll film cameras. An example of such a film cartridge is found in United States Design Patent No. 195,746, issued July 23, 1963, to Hubert Nerwin. A roll film for the cartridge of the Nerwin design patent is illustrated in United States Patent No. 3,086,862, issued Apr. 23, 1963, to Eagle et al. A typical cartridge construction and a typical camera construction for use therewith are illustrated in United States Patent No. 3,138,084, issued June 23, 1964, to D. C. Harvey.

The principal object of this invention has been to provide an improved releasable lock mechanism for a hinged cover of a camera and the like.

Another object of the invention has been to provide such a hinged cover and releasable locking mechanism therefor, in which the releasable locking mechanism is constructed in an economically simple and inexpensive manner.

Still another object of the invention has been to provide such a hinged cover and releasable locking mechanism therefor, in which the hinge and releasable lock mechanism are entirely within the camera, and a release button extends through a passage in the side wall of the camera to the exterior thereof.

In one aspect of the invention, a camera may comprise a central housing member having a front cover fixed thereto and to which at least part of the lens and light-admitting means is attached.

In another aspect of the invention, the central housing may have a back cover providing access to the central housing for the loading and unloading of film cartridges.

In still another aspect of the invention, a support for a hinge may be mounted within the central housing and it may include spaced, parallel ears having aligned trunnions thereon. A hinge plate may be mounted on the inside of the back cover and it may include spaced, parallel ears having holes therethrough that match the trunnions on the ears of the hinge support, so that the back cover can be pivotally connected to the hinge support.

In a further aspect of the invention, a lock may be attached to the inside of the back cover, and it may comprise a hook-shaped end extending away from the inside of the back cover.

In a still further aspect of the invention, a generally C-shaped member may be mounted within the central housing in a manner such that the legs thereof extend inwardly and the portion joining the legs extends outwardly through a passage in the wall of the central housing to the exterior thereof.

In another aspect of the invention, the legs of the C-shaped member may be bifurcated to receive a spring in the form of a reed that extends between pairs of aligned bosses, spaced on each side of the hooked portion of the lock.

The construction is such that the reed spring normally assumes a straight-line position so that the hooked end of the lock will engage it and retain the hinged back cover locked. In this straight-line position of the reed spring, that portion of the C-shaped member that joins the legs thereof extends through the side wall of the central housing to the exterior thereof. Pressing this portion of the C-shaped member inwardly causes its bifurcated legs to bow the reed spring, thereby unlatching the lock so that the back cover can be pivotally opened. Upon release of the C-shaped member, the reed spring returns to its straight-line position for latching onto the hooked end of the lock when the back cover is closed.

Figure 5:
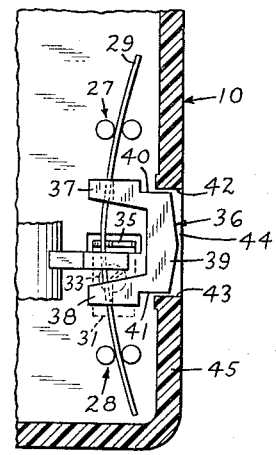
Figure 6:
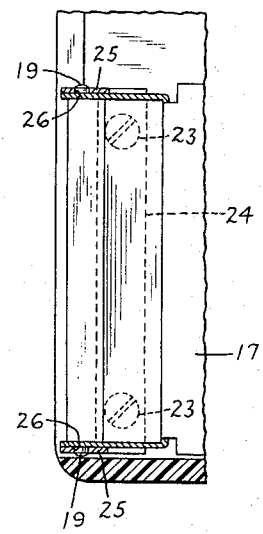
Figure 7:
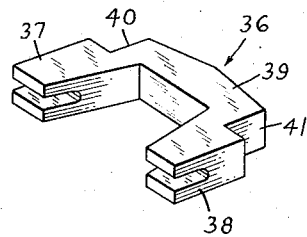

Other and further objects, features and advantages of the invention will become apparent from the following description taken in connection with the appended drawings, in which:

FIG. 1 is a top plan view of a camera to which the principles of the invention have been applied;
FIG. 2 is a portion of the view shown in FIG. 1, certain parts being broken away to show others;
FIG. 3 is a view similar to FIG. 2, showing the back cover of the camera partially opened;
FIG. 4 is a sectional view taken substantially along line 4—4 of FIG. 2;
FIG. 5 is a view similar to FIG. 4 with certain of the parts in different positions;
FIG. 6 is a view taken substantially along line 6—6 of FIG. 2; and
FIG. 7 is a perspective view of the C-shaped lock release member.

Referring now to the drawings, the principles of the invention are shown as applied to a camera including a central body portion 10 to which a front cover 11 is attached. Front cover 11 supports a light-admitting member 12 including the camera lens means, and a crank 13 may be provided for winding the film through the camera as is well known in the art.

A hinge support 14 may comprise a flat portion 15, the dimension at right angles to FIGS. 1, 2 and 3 being substantially that of the width of the central housing 10. It is fixed to the boss-like elements 16 within housing 10. An inclined portion 17 extends from portion 15 and includes ear portions 18 at each edge of the inclined portion 17. Near the outer end of each ear 18, there may be provided a dimpled trunnion 19 for a purpose to be described later.

A back cover 20 may have a shoulder 21 on its interior surface, on which shoulder a hinge plate 22 may be fixed by screws 23. The hinge plate 22 may include a portion 24 having substantially the same dimension at right angles to FIG. 2 as does hinge support 14. The ends of portion 24 are bent at right angles to portion 24, forming parallel legs 25 having aligned holes 26 that snap over the dimpled trunnions 19 pivotally connecting the hinge plate 22 to the hinge support 14.

Two pairs of slightly spaced bosses 27, 28 (FIG. 4) are mounted in aligned relation within the central housing 10. A reed-like spring 29 is located between, and supported by, the slightly spaced bosses 27, 28. Referring to FIGS. 2 and 3, a lock 30 is formed from an angle member, one leg 31 of which is fixed to a support on the inside of back cover 20 opposite the location of shoulder 21 by means of a screw 33. The other leg 34 of lock 30 includes a hook 35 that latches onto reed spring 29 when the latter is in a straight-line position as shown in FIG. 4.

Referring to FIGS. 4, 5 and 7, a C-shaped member 36 includes legs 37, 38 that are connected together by a portion 39. The portion 39 is provided with parallel ways 40, 41 that are adapted slidingly to engage the walls 42, 43 of an opening 44 that extends through the side wall 45 of the center housing 10. The legs 37, 38 are bifurcated as shown in FIG. 7 to receive the reed spring 29. Spring 29 normally maintains the member 36 in the position shown in FIG. 4 with the hook 35 of lock 30 latched to it. Pressing the member 36 inwardly causes the reed spring 29 (FIG. 5) to bow, releasing the lock 30 so that the back cover 20 can be pivoted about trunnions 19 to provide access to the interior of central housing 10 for loading and unloading film cartridges.

While the invention has been described in connection with a specific embodiment thereof and in a specific use, various modifications thereof will occur to those skilled in the art without departing from the spirit and scope of the invention as set forth in the appended claims.

What is claimed is:

1. In a camera, the combination comprising a central housing; a front cover attached to said central housing and adapted to support light-admitting means; a back cover pivotally connected to said central housing; a hooked lock fixed to said back cover; a reed-like spring mounted within said central housing, means in said central housing to retain said reed-like spring normally in a straight line position and in the path of said hooked lock as said back cover is pivoted to a closed position, said reed-like spring and said hooked lock being positioned relative to each other so that said hooked lock displaces and latches onto said reed-like spring when said back cover is closed; and movable means extending from the interior of said central housing to the exterior thereof and being arranged to contact said reed-like spring and to bow said reed-like spring out of latching engagement with said hooked lock when said movable means is pressed inwardly of said central housing.

2. In a camera, the combination comprising a central housing and adapted to support light-admitting means; a back cover pivotally connected to said central housing; a hooked lock fixed to said back cover; a reed-like spring mounted within said central housing and normally retained in a straight-line position, whereby said hooked lock displaces and latches onto said spring when said back cover is closed; and a release for said lock including a member having spaced parallel legs, each of said legs being bifurcated for receiving said reed spring at points on each side of said hooked lock, and a portion joining said legs that extends through the side wall of said central housing.

3. In a camera, the combination comprising a central housing; a front cover attached to said central housing and adapted to support light-admitting means; a hinge support mounted within said central housing and having parallel ears at each edge thereof, said ears including aligned trunnion means thereon; a back cover for said central housing; a hinge plate fixed to the inside of said back cover and including spaced ears that have aligned holes therein for receiving said trunnion means; a hooked lock fixed to said back cover; a reed-like spring mounted within said central housing and normally retained in a straight-line position, whereby said hooked lock displaces and latches onto said spring when said back cover is closed; and a release for said lock including a member having spaced parallel legs, each of said legs being bifurcated for receiving said reed spring at points on each side of said hooked lock, and a portion joining said legs that extends through the side wall of said central housing.

4. In a camera, the combination comprising a central housing; a front cover attached to said central housing and adapted to support light-admitting means; a back cover pivotally connected to said central housing; a hooked lock fixed to said back cover; pairs of aligned, slightly spaced bosses within said central housing; a reed-like spring mounted between the slightly spaced bosses and normally retained in a straight-line position, whereby said hooked lock displaces and latches onto said spring when said back cover is closed; and means extending to the exterior of said central housing which, when pressed inwardly, bows said reed spring to unlatch it from said hooked lock.

5. In a camera, the combination comprising a central housing; a front cover attached to said central housing and adapted to support light-admitting means; a back cover pivotally connected to said central housing; a hooked lock fixed to said back cover; pairs of aligned, slightly spaced bosses within said central housing; a reed-like spring mounted between the slightly spaced bosses and normally retained in a straight-line position, whereby said hooked lock displaces and latches onto said spring when said back cover is closed; and a release for said lock including a member having spaced parallel legs, each of said legs being bifurcated for receiving said reed spring at points on each side of said hooked lock, and a portion joining said legs that extends through the side wall of said central housing.

References Cited

UNITED STATES PATENTS

| 1,775,332 | 9/1930 | Traumuller | 272—87 XR |
| 2,554,333 | 5/1951 | Kaplowitz | 95—11 XR |
| 2,808,769 | 10/1957 | Polhemus | 95—11 |
| 2,994,148 | 8/1961 | Eddelson | 240—147 XR |
| 3,115,078 | 12/1963 | Freeman | 95—11 |

JOHN M. HORAN, *Primary Examiner.*

NORTON ANSHER, *Examiner.*

FRED BRAUN, *Assistant Examiner.*

UNITED STATES PATENT OFFICE
CERTIFICATE OF CORRECTION

Patent No. 3,358,574                     December 19, 1967

Dino A. Liverano

It is hereby certified that error appears in the above numbered patent requiring correction and that the said Letters Patent should read as corrected below.

Column 3, line 40, after "housing" insert -- ; a front cover attached to said central housing --.

Signed and sealed this 11th day of February 1969.

(SEAL)
Attest:

Edward M. Fletcher, Jr.                    EDWARD J. BRENNER

Attesting Officer                          Commissioner of Patents